(No Model.) 3 Sheets—Sheet 1.
A. GREIG, R. H. SHAW & J. WHITTINGHAM.
TRACTION ENGINE.
No. 316,774. Patented Apr. 28, 1885.
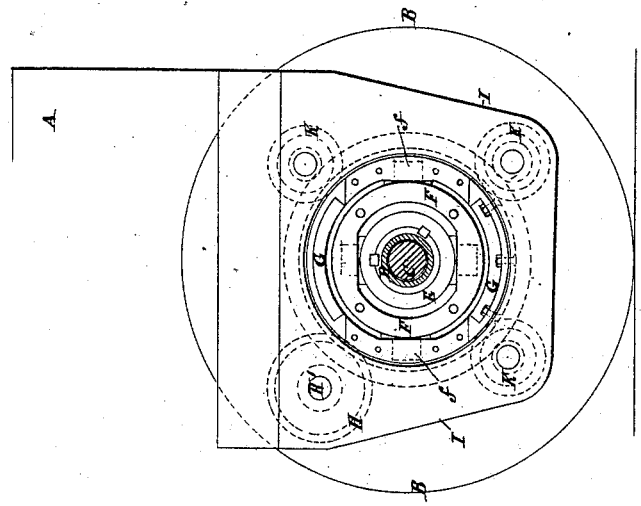
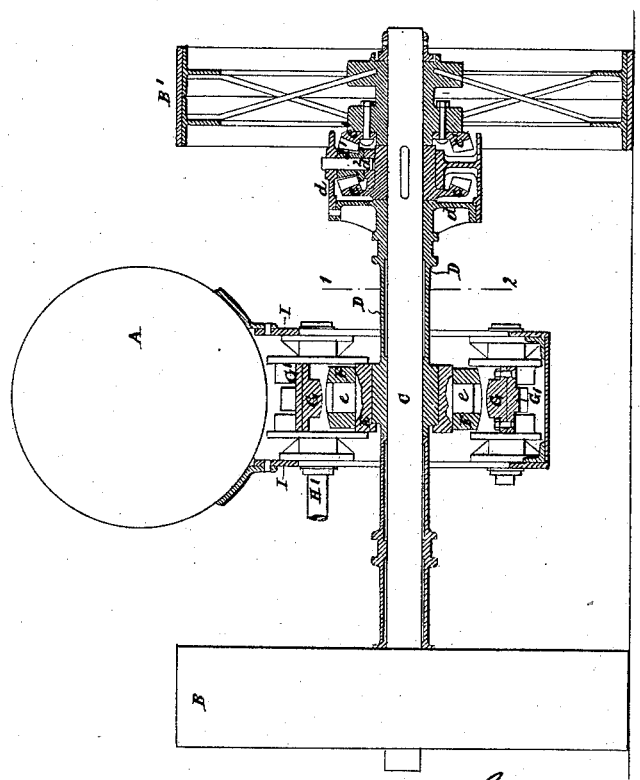

(No Model.) 3 Sheets—Sheet 2.
A. GREIG, R. H. SHAW & J. WHITTINGHAM.
TRACTION ENGINE.
No. 316,774. Patented Apr. 28, 1885.
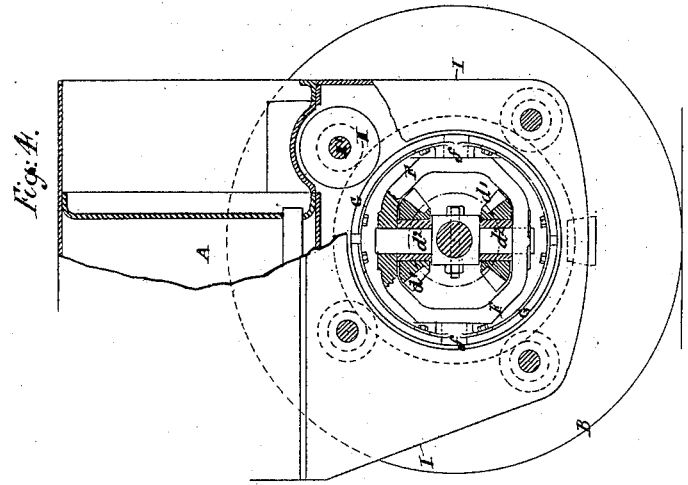
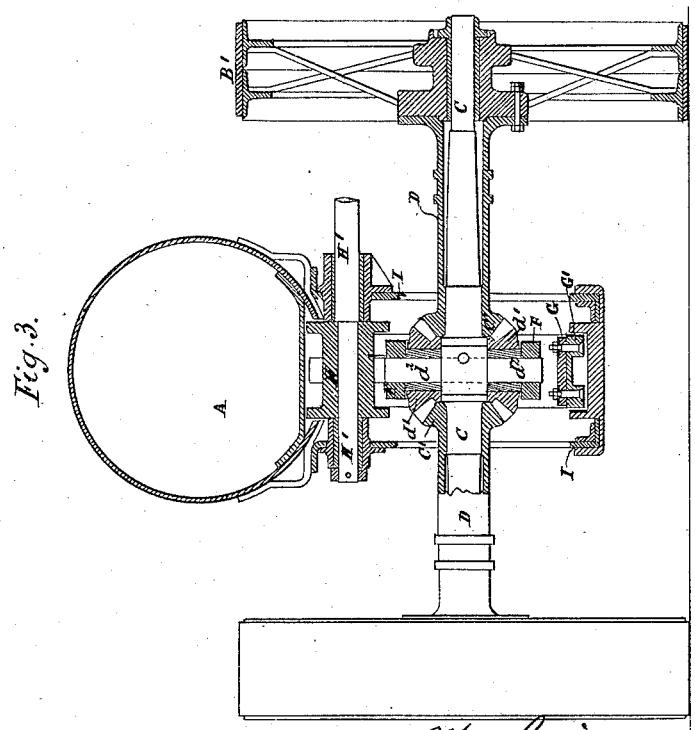

(No Model.) 3 Sheets—Sheet 3.
A. GREIG, R. H. SHAW & J. WHITTINGHAM.
TRACTION ENGINE.
No. 316,774. Patented Apr. 28, 1885.
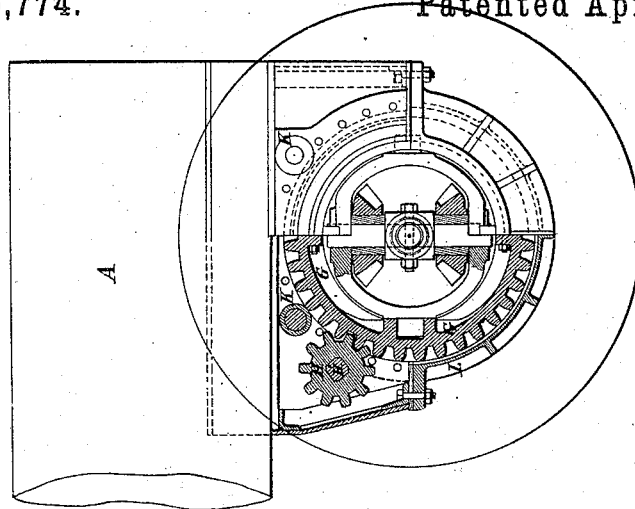
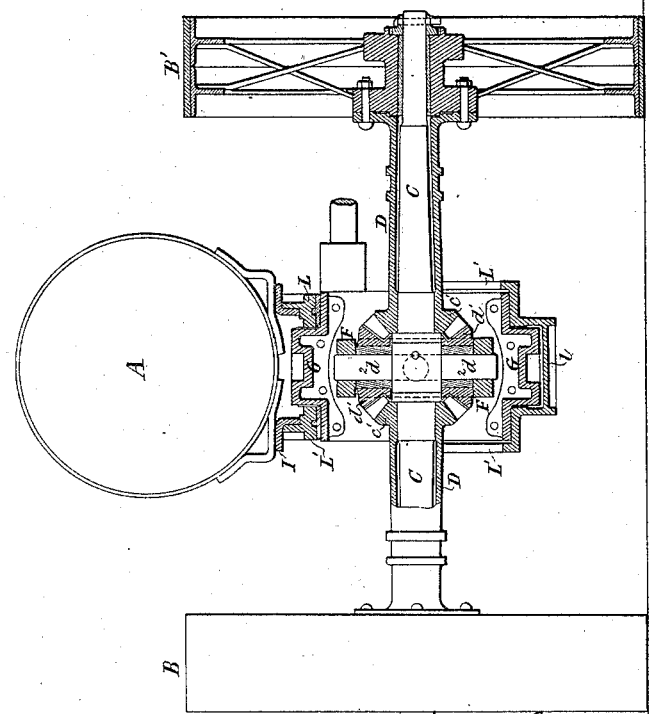
Witnesses.
Allan McLane Abert
James Young.
Alfred Greig
R. H. Shaw
Jno. Whittingham
Inventors
By attys Baldwin, Hopkins & Peyton

UNITED STATES PATENT OFFICE.

ALFRED GREIG AND RICHARD HOLGATE SHAW, OF LEEDS, COUNTY OF YORK, AND JOHN WHITTINGHAM, OF NANTWICH, COUNTY OF CHESTER, ENGLAND.

TRACTION-ENGINE.

SPECIFICATION forming part of Letters Patent No. 316,774, dated April 28, 1885.

Application filed February 20, 1885. (No model.) Patented in England July 30, 1884, No. 10,780.

*To all whom it may concern:*

Be it known that we, ALFRED GREIG and RICHARD HOLGATE SHAW, both of the Steam-Plow Works, in Leeds, in the county of York, England, engineers, and JOHN WHITTINGHAM, of Nantwich, in the county of Chester, England, engineer, subjects of the Queen of Great Britain, have invented certain new and useful Improvements in the Locking and Driving Gear of Traction-Engines, Steam-Plow Engines, and other Engines of a like nature, (for which we have applied for Letters Patent in Great Britain, No. 10,780, dated July 30, 1884,) and of which the following is a specification.

This invention has for its object improvements in the locking and driving gear of traction-engines, steam-plow engines, and other engines of a like nature. In an arrangement known as "Whittingham's gear" the leading wheels of a traction-engine are driven without interfering with the locking of the axle. The axle is surrounded by a pair of rings and the parts are connected by gimbal-joints. The outer ring is supported upon rollers, and the power to drive the axle is applied to it. Thus while the axle is free to incline to accommodate itself either to the inequalities of the road or to the steerage of the engine, the axle is compelled by the driving-gear to rotate continuously. In Whittingham's arrangement, however, the two leading wheels are, if not fast upon the axle, driven by ratchet or clutch arrangements, and consequently must, while operating as driving-wheels, rotate at the same speed. The present invention provides that the two wheels on the fore axle may, while driving, rotate at different speeds, by which the steerage of the engine and its passage around curves is greatly facilitated. We effect this by connecting the inner ring of the gimbal-joint with a tube surrounding the axle and carrying a frame in which beveled pinions upon stud-axes are mounted. These axes are radial to the axle, and the pinions which they carry gear with two beveled wheels concentric with the axle and one on either side of them. One of the beveled wheels is fixed to one of the road-wheels, which revolves loose on the axle, and the other beveled wheel is fixed to the axle. The axle passes from side to side of the engine through the driving-tube, and has one of the road-wheels fast upon it. The rotation of the beveled pinions then allows of the road-wheels to travel at different rates, and to accommodate themselves to the steerage. The arrangement may be modified by mounting the beveled pinions upon studs radiating from the axle itself at the center thereto. The same studs then serve as the pivots connecting the axle with the inner ring of the gimbal. These pinions engage with other beveled pinions formed or fixed at the inner ends of tubes surrounding the axle. These tubes pass right and left of the engine, and upon them the two road-wheels are fixed. The outer ring of the gimbal has spur-teeth upon it, and is driven by a pinion upon a horizontal transverse axis beneath the smoke-box of the engine. In some cases, in place of supporting the outer ring of the gimbal upon rollers, we cause it to revolve as an axis within a bearing of large dimensions beneath the boiler of the engine at the smoke-box end. The ring then rests upon brasses, with which this bearing is bushed. Beneath the bearing there is a cup inclosing the under side of the wheel. This cup serves as a trough to contain oil to insure the effectual lubrication of the parts revolving in the bearing.

In order that our said invention may be most fully understood and readily carried into effect, we will now proceed to describe the drawings hereunto annexed.

Figure 1 is a vertical cross-section of apparatus in accordance with our invention. The section is taken on the center line of the front wheels of a traction-engine boiler. Fig. 2 is a section taken on the line 1 2, Fig. 1, and shows the bracket by which the apparatus is attached to the boiler in view. Figs. 3 and 4 show a modification. Figs. 5 and 6 show another modification.

In Figs. 1 and 2, A is the boiler-barrel, B B' the road-wheels, and C the fore axle of the engine. On this axle is mounted a tube, D, which embraces it, and keyed to this tube is a ring, E, having on its outer circumference pins $e\ e$. Outside this ring is a gimbal-ring, F, made in halves jointed transversely to the axle and bolted together with four bolts, in such manner that it embraces the pins $e\ e$. It has on its outer diameter pins $f\ f$, which are embraced by another gimbal-ring, G, built up in segments bolted firmly together, and on the outside of this ring is another ring, G′, having around its external circumference spur-teeth, into which the teeth of a pinion, H, gear. This pinion is keyed onto a shaft, H′, driven by the engine. Beneath the barrel of the boiler is attached a strong frame, I, carrying rollers K K, arranged in three pairs, their flanges, and also those of the pinion which forms the fourth roll, serving as guides in which the ring G may revolve in a vertical plane. It will be seen that the axle C can be locked to a considerable angle for guiding the engine round curves, and that it may also have a large amount of cant without in any way interfering with the teeth of the pinion H, gearing truly with the teeth of the spur-segment ring G′. The two road-wheels B B′ are both driven through the tube D, on which the ring F is firmly keyed. This tube has at its outer end a frame, $d$, carrying two bevel-pinions, $d'\ d'$, mounted on pins $d^2$, and gearing into two bevel-wheels, $c\ c'$, one of which, $c$, is keyed firmly onto the road-axle or shaft C, and the other, $c'$, is bolted firmly onto the road-wheel B′. This wheel is not secured to the shaft, but it can turn on it when the engine is passing around curves. The other wheel, B, being keyed firmly onto the shaft C, always revolves with it. The shaft C can turn in the tube D, but the tube D′ may be fixed to the shaft and turn with it, as it merely serves as a distance-collar.

The shaft H′ of the pinion H is driven from the engine by a chain and chain-wheels, or it may be in other convenient manner, and the pinion gearing into the teeth of spur-ring G′ carries around with it the tube D, the bevel-pinions $d'$, and the bevel-wheels $c\ c'$, into which they gear, and which are fast with the road-wheels. So long as the engine pursues a straight course the whole gearing, shaft, and road-wheels rotate together at a uniform speed; but so soon as the shaft is locked to steer the engine around a curved track, the tube D rotates slightly in one or other direction, thus allowing the road-wheels to accommodate themselves to the curve.

A modification of the preceding is shown by Figs. 3 and 4, where Fig. 3 is a vertical cross-section, all the parts excepting the shaft and one road-wheel being shown in section, the line of section being taken through the center of the pinion-shaft and the road axle or shaft, and Fig. 4 is a side view of the front part of the boiler and bracket carrying the front axle of a traction-engine, some of the parts being shown in section, the line of section being taken on the center line of the boiler. In these figures similar parts are marked with like letters of reference to the first figures.

The mode of carrying the gimbal-ring G on rollers K is very similar to the preceding arrangement, but, in addition to its being guided by flanges formed on the rollers, it revolves within flanges formed in the frame I, and in place of the bevel-pinions $d'\ d'$ being carried on a frame on the tube D, they are mounted on a stud or pin, $d^2$, passing through the axle or shaft C, where it is secured by a bolt. This stud also serves as a pivot for connecting the shaft to the inner ring, F, of the gimbal. The pinions $d''\ d''$, carried by the pin $d^2$, engage with the bevel-wheels $c'\ c'$, formed or fixed at the inner ends of the tubes D D, surrounding the axle. These tubes pass right and left, and have at their outer ends flanges to which the road-wheels B B are bolted. Both tubes and road-wheels are loose on the shaft, the latter being bushed with brass. The outer ring, G, of the gimbal is made in halves, each having a boss embracing one of the pins $f$ on the inner ring, and outside the ring G is another ring, G′, having spur-teeth on its outer circumference, and into these teeth gear the teeth of a pinion, H, keyed onto a horizontal transverse shaft, H′, situated beneath the smoke-box of the boiler. This shaft is driven direct from the engine.

Another modification is shown by Figs. 5 and 6. Fig. 5 is a vertical cross-section on a line passing through the center of the road-axle or shaft, all the parts excepting the shaft, gimbal-pin, and one of the road-wheels being shown in section; and Fig. 6 is a side view of the front part of the boiler of a traction-engine and bracket carrying the front axle, some of the parts being shown in section. In these figures parts similar to the other arrangements are marked with like letters of reference. In this arrangement, in place of the outer ring, G, of the gimbal being mounted on rollers, it revolves as an axis within a large bearing, L, bored to receive it. This bearing is carried by the strong frame I, and has fitted (at the top side where the weight comes) brasses to reduce the friction, and at the lower portion of the bearing is a cap, L′, completing the bearing; and it forms, also, at the bottom, a cup, $l$, inclosing the under side of the toothed ring G of the gimbal. The cup serves as a trough to contain oil to insure the effectual lubrication of the bearing. In this arrangement the outer ring, G, is cast in halves, which are firmly bolted together. It also has its spur-teeth cast on.

The mode of driving the wheels is exactly similar to that shown in the other arrangements, and in order to relieve the weight which would otherwise come wholly on the large bearing two small plain friction-rollers, K, are fitted, and so adjusted that a large portion of the weight comes upon them.

In each of the modifications the axle of the steering-wheels is able to move universally about a central point, while simultaneously each of the wheels upon the axle is driven at a speed in accordance with the distance the wheel has to pass over.

Having now particularly described and ascertained the nature of our said invention and in what manner the same is to be performed, we declare that what we claim is—

The combination, with the locking and driving gear of traction-engines, steam-plow engines, and other engines of a like nature, of gimbal-rings interposed between the axle and the body of the engine, and of differential toothed gearing interposed between the wheels upon the axle and the outer gimbal-ring, to which the driving power is applied, substantially as described.

ALFRED GREIG.
RICHARD HOLGATE SHAW.
JOHN WHITTINGHAM.

Witnesses:
  O. H. HOOVER,
  J. W. THACKERAY.
    *Steam-Plow Works, Leeds, Clerk.*